July 9, 1940.  R. H. LAWSON  2,207,464
INDICATOR OR MEASURING MEANS FOR KNITTING OR OTHER MACHINES AND METHOD
Original Filed Oct. 26, 1932   4 Sheets-Sheet 1
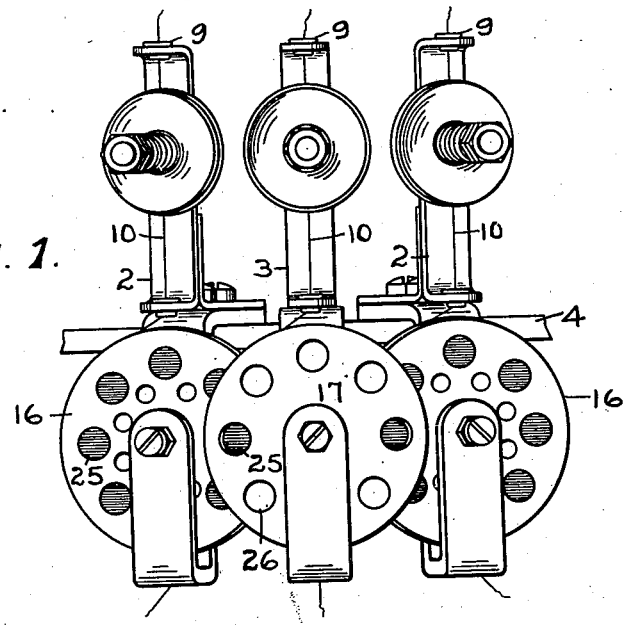
FIG. 1.
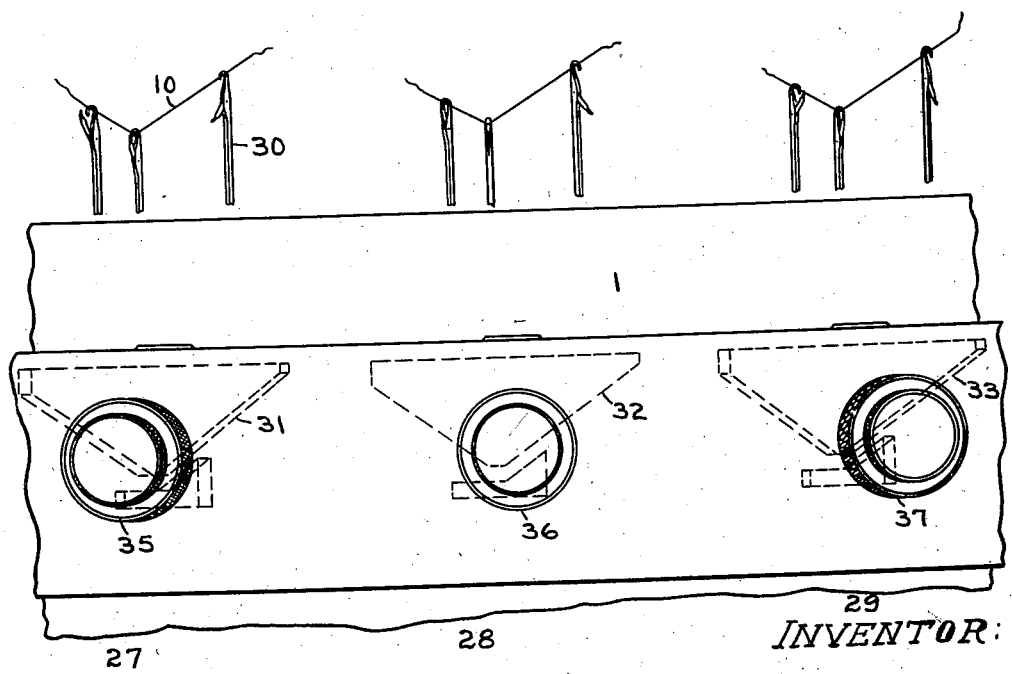
INVENTOR:
ROBERT H. LAWSON,
By Roy F. Lovell
ATT'Y.

July 9, 1940. R. H. LAWSON 2,207,464
INDICATOR OR MEASURING MEANS FOR KNITTING OR OTHER MACHINES AND METHOD
Original Filed Oct. 26, 1932 4 Sheets-Sheet 3

INVENTOR:
ROBERT H. LAWSON,
By Roy F. Lovell
ATT'y.

July 9, 1940.   R. H. LAWSON   2,207,464
INDICATOR OR MEASURING MEANS FOR KNITTING OR OTHER MACHINES AND METHOD
Original Filed Oct. 26, 1932   4 Sheets-Sheet 4

INVENTOR:
ROBERT H. LAWSON,
By Roy F. Lovell
ATT'Y.

Patented July 9, 1940

2,207,464

UNITED STATES PATENT OFFICE 2,207,464

INDICATOR OR MEASURING MEANS FOR KNITTING OR OTHER MACHINES AND METHOD

Robert H. Lawson, Pawtucket, R. I., assignor to Hemphill Company, Central Falls, R. I., a corporation of Massachusetts Application October 26, 1932, Serial No. 639,688
Renewed June 21, 1938

32 Claims. (Cl. 66—125)

This invention relates to a method of and mechanism for maintaining the speed of moving elements such as yarns constant, i. e., with respect to each other. More specifically the invention relates to the feeding of a plurality of strands to a machine such as a knitting machine, the means hereinafter to be more fully described, being adapted to serve as a detector and indicate to the observer when one yarn is being fed to the knitting machine at a more rapid rate than another yarn.

In the drawings:

Fig. 1 is a view in elevation showing the detector applied to a knitting machine;

Figure 2:
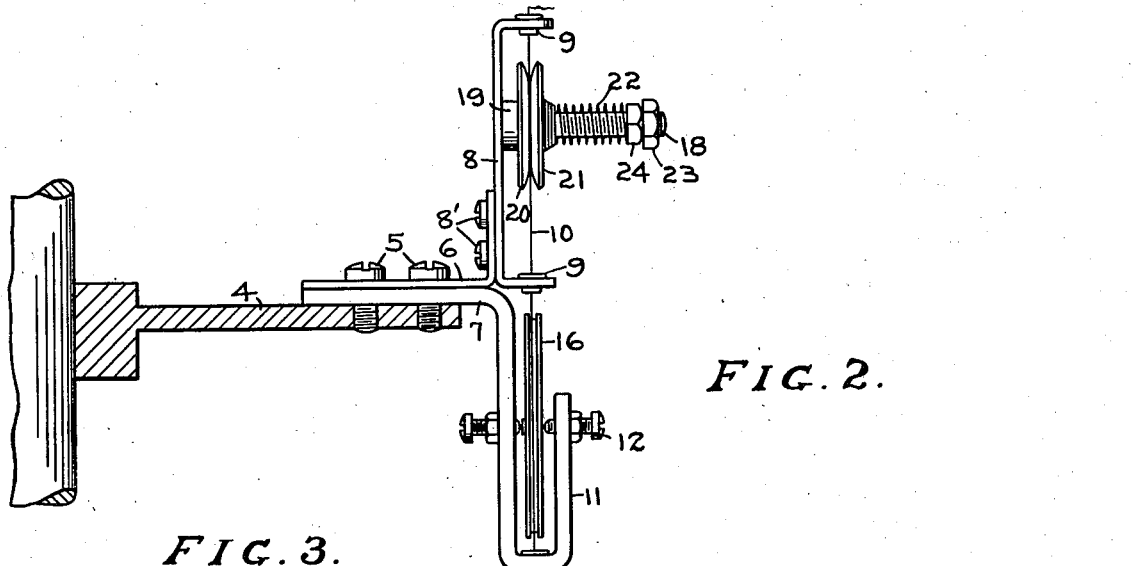
Fig. 2 is a view in side elevation and partly in section of one of the detectors and knitting machine shown in Fig. 1.
Figure 3:
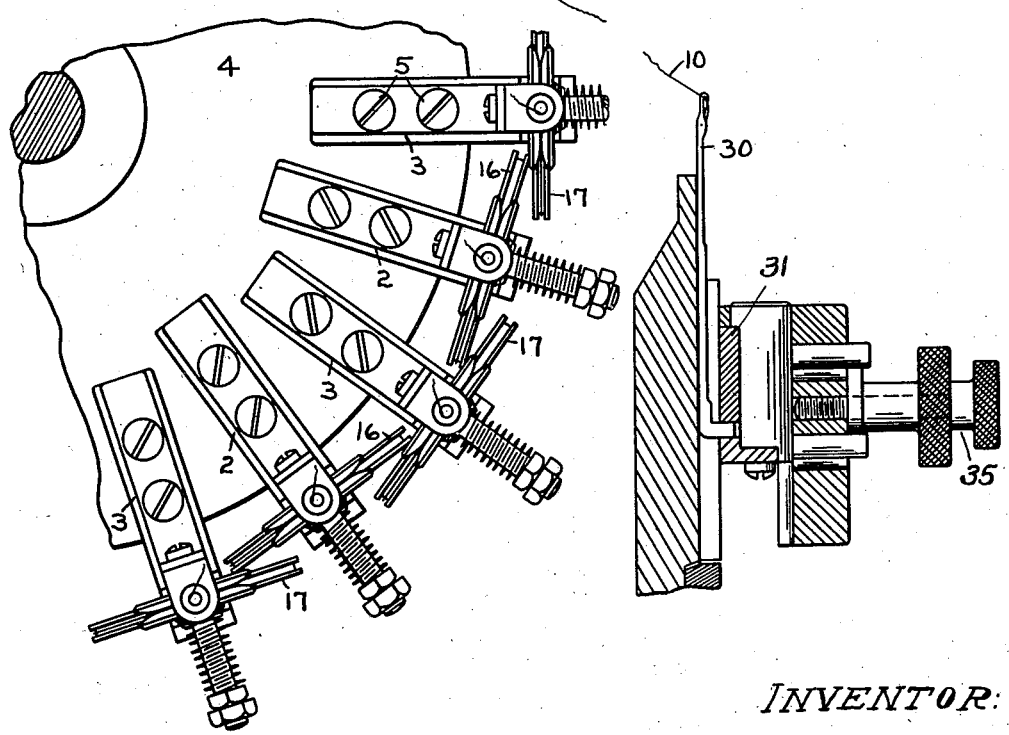
Fig. 3 is a fragmentary view in plan showing a plurality of detectors in operative relation with one another.
Figure 4:
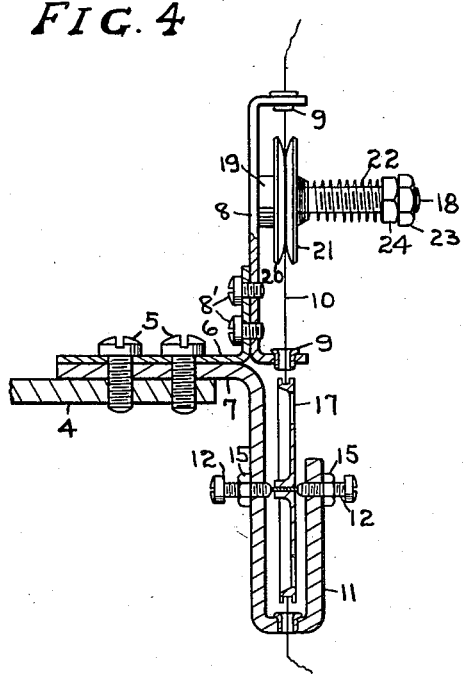
Fig. 4 is a view in section of the detector mechanism shown in Fig. 2.

When the detector mechanism is used in conjunction with a multi-feed knitting machine, a portion of which is shown in Fig. 1 being indicated by the numeral 1, a plurality of brackets 2 and 3 are mounted upon the upper surface of a supporting plate 4. As shown in Figs. 1 and 3 the brackets 2 and 3 alternate, the brackets 2 being companion to the alternate feeds and the brackets 3 being companion to the intermediate feeds. The brackets 2 and 3 are similarly constructed all being attached to the plate 4 as by means of screws 5 which screws 5 pass through angle brackets 6 and 7 thus securing them together. Each angle bracket 6 is connected to another bracket 8 as by means of screws 8'. The brackets 8 are U-shaped, and through the arms thereof extend eyelets 9 through which pass threads or yarns 10. The brackets 7 are each provided with U-shaped arms 11 through the opposed portions of which arms pass bearing screws 12. Each screw 12 is provided with a conical bearing 13 in one end thereof and within opposed conical recesses 13 of companion screws 12 are seated pintles 14 having rounded ends for seating in the conical bearings 13, thereby minimizing the bearing friction. The screws 12 pass through threaded holes in the arms 11 being retained in adjusted position as by means of nuts 15. Mounted upon each pintle 14 is a disc such as 16 or 17 such discs being provided with peripheral grooves in which threads 10 are received as indicated in several figures of the drawings. Attached to and projecting laterally from each bracket 8 is a threaded shaft 18 which passes through a spacing collar 19 both the shaft and collar being riveted to the bracket 8. Adjacent to each collar 19 is a tension disc 20 and opposed thereto is a companion tension disc 21, a thread 10 being adapted to pass between them and be tensioned thereby, the tension of the discs being regulated as by means of a coil spring 22 which surrounds the shaft 18, threaded on the outer end of which are nuts 23 and 24, the last named nut 24 being for the purpose of adjustably tensioning the spring 22 and thereby the tension imposed upon the yarn by the discs 20 and 21.

The brackets 2 and 3 are identical, the brackets 2 being attached to the plate 4 nearer to the center of the knitting machine which is preferably of the circular type.

The discs 16 are provided with a series of blackened recesses 25 which are circumferentially arranged adjacent to the periphery of each disc, the adjacent recesses being equally spaced from one another. The discs 17 are provided with holes 26 which extend through the said discs, such holes being spaced and positioned on the discs 17 to correspond to the recesses 25 on the discs 16. As will be noted by inspection of Figs. 1 and 3, the discs 16 are circularly arranged with respect to the plate 4, and likewise the discs 17 are circularly arranged with respect to the plate 4, but beyond the discs 16 and overlapping the same. A thread or yarn 10 which is led from a source of yarn supply down through the upper eyelet 9, between the tension discs 20, 21, and through the lower eyelet 9, passes part way around the periphery of each disc 16 and 17 being received in the peripheral grooves thereof, all as shown in Figs. 1, 2, 4, 5 and 6.

Figure 7:
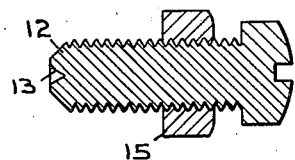
Figs. 7 and 8 are detail views.
Figure 8:
Figure 9:
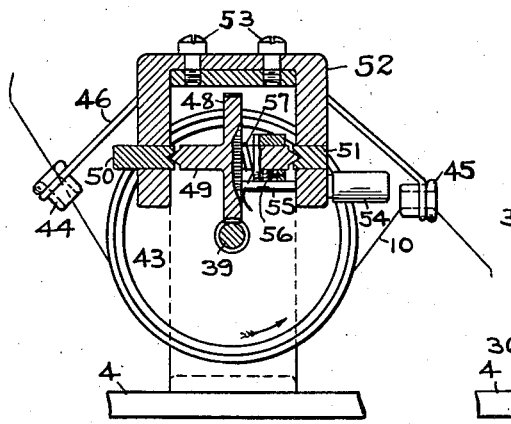
Figs. 9 and 10 are respectively side and front views in elevation and partly in section showing a modified form of detector.
Figure 10:
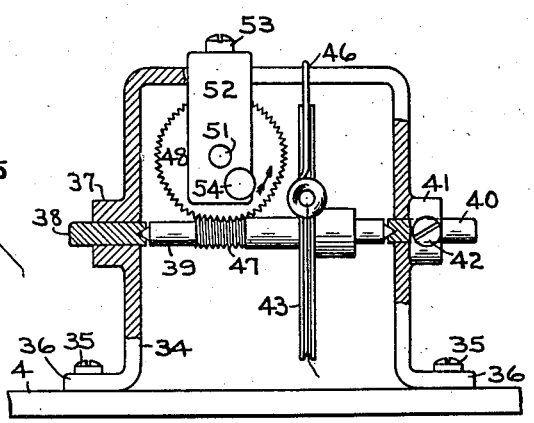

Merely for illustrating one possible use of the invention, the detector is shown as being applied to a multi-feed knitting machine 1, three of said feeds respectively numbered 27, 28 and 29 being more or less incompletely shown in Fig. 1. Needles 30 of the so-called pivoted latch type are shown more or less diagrammatically in Fig. 1, such needles being shown as drawing yarns from a source of supply. It is essential that, in the knitting of fabric with a plurality of feeding stations, the several yarns (one to each station) be uniformly knitted into the fabric and by that is meant that the same amount of each yarn should be knitted into the fabric in a given time. In multi-feed knitting machines it is essential that the stitch cams such as 31, 32 and 33 be properly adjusted to cause their needles to draw a uniform length of stitch, such stitch cams being commonly adjusted by manually turned wheels such as 35, 36 and 37. If a cam such as the cam 31 be so adjusted as to cause the needles to draw a longer stitch than is being drawn by the needles controlled by an adjacent cam 32, it is obvious that much more of the yarn will be drawn at the feeding station 27 than will be drawn by the needles knitting at the feeding station 28. By causing a yarn 10 to pass part way around the periphery of disc 16 and causing another yarn 10 to pass part way around the periphery of an adjacent disc 17, the two discs are rotated on their axes which, as indicated in Figs. 7 and 8, are as nearly frictionless as possible thereby permitting the said discs 16 and 17 freely to turn on their axes. In the illustration just given, the yarn being knitted at the feeding station 27 is being drawn faster from a source of supply than is the yarn being knitted at the feeding station 28, the result being that the disc 16 companion to the feeding station 27, is being rotated by its yarn at a greater speed than is the companion disc 17. As a consequence of the greater speed of rotation of the disc 16 as compared with the speed of rotation of the adjacent disc 17, a hole 26 in the disc 17 shown as being in register with a black spot 25 on the disc 16, will not remain in that position but the greater speed of rotation of the disc 16 will cause the spots 25 to appear to move in the direction of greater rotation of the disc 16 in which case the operator on viewing the moving spots will either adjust the stitch cam 31 to draw a shorter stitch or will adjust the stitch cam 32 to draw a longer stitch.

By the use of the overlapping discs 16 and 17 in the manner just described, it is possible for an operator to walk slowly around a knitting machine having as many as 20 feeds and readily determine whether all of the feeds are knitting stitches of the same length, which is especially desirable in so-called body machines having a great number of feeding stations.

The invention is applicable to hosiery knitting machines of the split foot or other variety having a plurality of feeds. Ordinarily if it be attempted to knit circular courses of a stocking on a multi-feed knitting machine, the result is what is known in the trade as a "wash-board" effect, the stocking showing horizontal lines due to the difference in tensions to which the yarns are being subjected, this difference in tension at times being due to the fact that one yarn bobbin is nearly empty and another one nearly full. By incorporating in such a machine, a detector of the type hereinbefore described, it is possible so to adjust the stitch cams and/or tensions as to knit a fabric having a uniform appearance.

In Figs. 9–13 inclusive there is disclosed a modified form of the invention consisting of a bracket 34 mounted upon the plate 4 opposite each feeding station. The bracket 34 as shown is attached to the plate 4 as by means of screws 35 which pass through feet 36 (provided by outturned ends of the bracket) and into the plate 4. The bracket 34 is more or less U-shaped in section being provided with a hub 37 in one arm thereof through which a bearing 38, similar in construction to the bearing 12, Fig. 3, passes. A shaft 39 may be provided with a rounded end to seat in the bearing 38. At its other end the shaft 39 is similarly shaped to seat in a bearing 40 similar to the bearing 38, such bearing 40 being supported in a hub 41. Set screws 42 may retain the bearings in position. Intermediate the ends of the shaft 39 is fixedly mounted a disc 43 provided with a grooved periphery in which is seated a thread or yarn 10, such yarn leading from a source of thread supply down through an eyelet 44 around the periphery of the disc 43 and in the groove thereof, and finally through another eyelet 45. The eyelets 44 and 45 are each mounted upon a wire 46 which is connected to the upper portion of the bracket 34 in any suitable manner. A worm 47 is formed upon the shaft 39 being in engagement with a worm-wheel 48 which turns in the direction of the arrow when yarn is being drawn from the source of supply. The worm-wheel 48 is mounted upon a pintle 49 which is connected to and turns in bearings 50 and 51, said bearings being mounted in arms of a bracket 52 which is connected to the upper portion of the bracket 34 by means of screws 53. The bearings for the pintle 49 are constructed similarly to the bearings shown in Figs. 7 and 8 and described in connection with the shaft 39. A pin 54 which has a reduced end 55 passes through a hole in one arm of the bracket 52, the inner end of which pins rests against an adjacent face of wheel 48. Surrounding the pintle 49 is a collar 56 adjustably retained in position as by means of a set screw. A spring 57 is coiled around the pintle 49 one end of such spring being seated against an adjacent face of the collar 56, the other end of the said spring being in frictional engagement with the adjacent face of the wheel 48.

Figure 11:
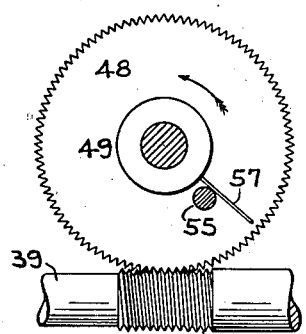
Figs. 11, 12 and 13 are views illustrating how the detector mechanism shown in Figs. 9 and 10 operates.
Figure 12:
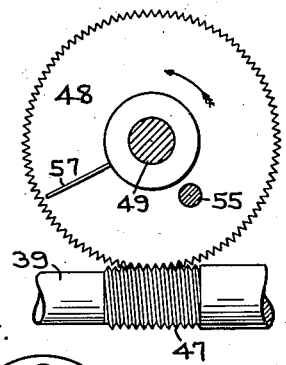
Figure 13:
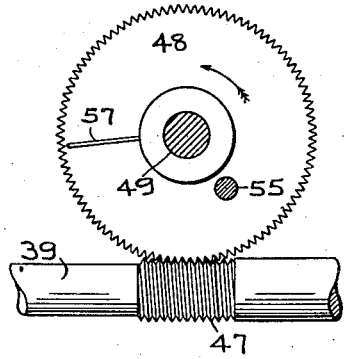

By referring to Figs. 11, 12 and 13, the operation of the detector mechanism will be clear. The drawing of the yarn 10 by the needle causes the disc 43 to rotate in the direction of the arrow, Fig. 9, which causes rotation of the shaft 39, the worm 47 causing rotation of the wheel 48 in the direction of the arrows, Figs. 10–13. In determining the relative feeding speeds of two yarns, pins 54 in adjacent detector mechanisms are inserted in the holes in the brackets 52, the springs 57 in the respective detector mechanisms being positioned in contact with the said pins 54 as indicated in Fig. 11. The knitting or other machine is then started and the two yarns 10 are drawn by the needles or other instrumentalities for a certain length of time at the end of which time the machine is stopped and the relative positions of the springs 57 are observed. Figs. 12 and 13 indicate the final position of two springs 57 companion to two yarns 10. The spring 57 in Fig. 12 having traveled through a greater arc than the spring 57 in Fig. 13, more yarn has been drawn by the needles or other instrumentalities at the feeding station companion to the disc 48 shown in Fig. 12 than has been drawn by the needles at the feeding station companion to the disc 48 shown in Fig. 13. In order to adjust the relative rates of feeds of the yarns, in the case of a knitting machine such as that disclosed in Fig. 1, the stitch cam companion to the disc 48 shown in Fig. 12 may be raised slightly to draw less yarn, or the tension on such yarn may be increased by increasing the tension imposed by the discs 20 and 21.

Figure 14:
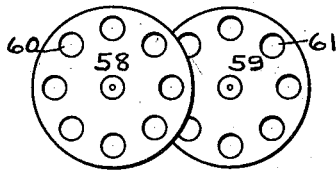
Fig. 14 is a view showing a modified form of movable detector elements such as discs.

In Fig. 14 is shown a modified form of the invention wherein are disclosed two discs 58 and 59 which are each provided with apertures 60 and 61. The holes in the disc 58 replace the markings 25 shown on the disc 16. Rotation of the discs 58 and 59 by the threads or yarns produces an optical effect, similar to that hereinbefore described, by means of which it can readily be determined whether or not two adjacent discs 59, 60 are rotating at the same speed.

Figure 5:
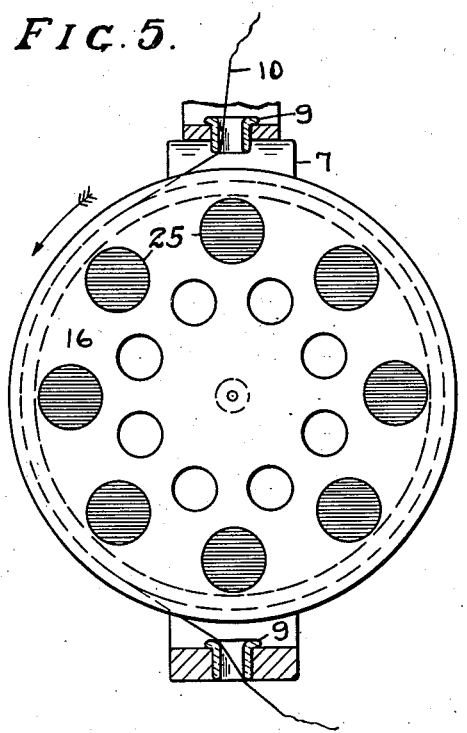
Figs. 5 and 6 are similar views of cooperating rotary elements of the detector.
Figure 6:
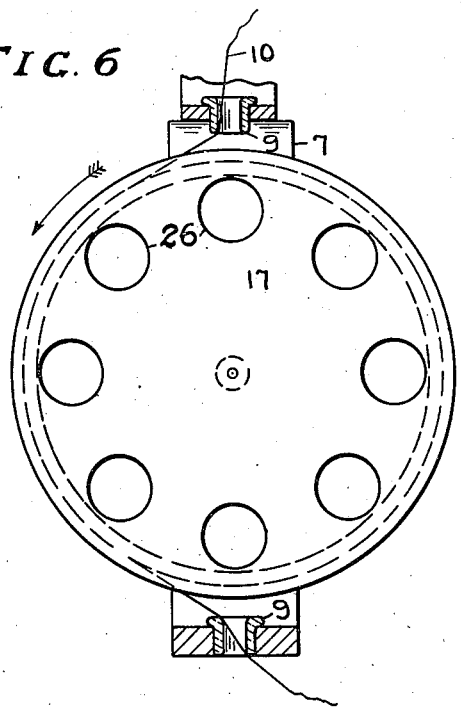

As hereinbefore described, the yarns or threads pass around the disc 16, 17 in such a manner as to cause the discs to rotate in the same direction, i. e., in the direction of the arrows, Figs. 5 and 6; however, obviously one yarn may pass through the eyelets 9 and around the disc 16 in the direction of the arrow, Fig. 5, whereas the other yarn, Fig. 6, may pass through the two eyelets 9 and around the disc in a direction opposite to that indicated by the arrow.

The construction and operation hereinbefore described, provides a means whereby the relative speed of feeding of two or more yarns, e. g., in a knitting machine, can be readily determined at any instant by the operator of the machine or mechanism. In the embodiment herein disclosed, the relative rate of feeding of the two yarns can be instantly determined by merely looking at the rotating disks such as 16 and 17.

The term uniform fabric appears in certain of the claims and by that terminology it is meant that the fabric is uniform to the extent that stitches of the same character are of substantially the same length.

Although the invention has been hereinbefore described in specific terms, the invention is applicable to the comparison or measurement of moving bodies or currents other than strand-like elements; and, when applied to strand-like elements obviously is not limited to use in connection with knitting machines. The invention, being especially useful with knitting machines, has been disclosed in connection with such use for illustrative purposes.

I claim:

1. An indicator mechanism for determining the relative rates at which yarns are fed to the needles of a machine, such mechanism consisting of movable elements adapted to be moved by the yarns as the said yarns are being drawn from the sources of supply, one of said elements being provided with at least one aperture and the other movable element being provided with a marking visible through the aperture of the other member, the construction being such that when the yarns are being withdrawn from their sources of supply at the same rate, the marking is visible through the aperture but when one yarn is being drawn from the source of supply at a faster rate than the other yarn the marking is displaced with respect to the aperture.

2. An indicator mechanism in combination with a multi-feed knitting machine, the detector consisting of rotatably mounted members, said members adapted to be rotated by yarns being drawn from sources of supply by the needles of the knitting machine, one of such rotary members having one or more peripheral apertures therein and the other member having corresponding markings on its periphery, the yarns when being fed at the same rate to the needles of the knitting machine at two adjacent feeds, the markings on one rotary member at such times being visible through the aperture or apertures of the other members and appearing to be stationary, and one yarn when it is being drawn from its source of supply at a faster rate than the other yarn, being adapted to cause an apparent relative displacement of the marking or markings with respect to the aperture or apertures.

3. A method of adjusting the feeding of two or more yarns to the needles of a knitting machine consisting in observing the relative rates of movement of yarn-movable members which are separate from the yarns and adjusting a stitch cam until the relative rates of movement of the said members are substantially the same.

4. An indicator for use in a multi-feed knitting machine for indicating whether two yarns are moving from their respective sources of supply at the same or different rates, wherein yarn movable elements which are separate from the yarns and which impose substantially no tension on the yarns, assist in determining which of the two yarns is moving from its source of supply at a faster rate, in combination with means for adjusting the relative feeding rates of the yarns to effect the knitting of uniform fabric.

5. A knitting machine having a rotary needle cylinder and a plurality of feeding stations, in combination with means associated with the feeding stations, such means being separate from the yarns and being movable by yarn engagement and by such movements indicating the relative feeding rates of two or more yarns, in combination with means for adjusting the relative feeding rates of the yarns to effect the knitting of uniform fabric.

6. A circular knitting machine of the independent needle type including a rotary needle cylinder and a plurality of feeding stations at each of which stations a yarn is knitted by the needles, in combination with an indicator, elements of which are associated with each feeding station, the construction being such that when two yarns are being fed to the needles at substantially the same rate that fact is indicated, and that when said two yarns are being fed to the needles at different rates the feeding rates of the said two yarns can be readily altered to permit the said two yarns to be knitted by the needles at substantially the same rate, thereby effecting the knitting of uniform fabric.

7. A circular knitting machine of the independent needle type having a plurality of feeding stations at each of which is a stitch drawing cam adapted to control the movements of the needles to knit a yarn, and in combination therewith movable indicator mechanism adapted visually to indicate to the operator of the knitting machine when two of the said yarns are being knitted by the needles at different rates so that the stitch drawing cams can be readily adjusted to cause said yarns to be uniformly knitted by the needles.

8. An independent needle knitting machine having a plurality of feeding stations and yarn movable elements companion to each feeding station for readily indicating the relative rates at which the yarns are being knitted at the several feeding stations.

9. A circular knitting machine having a rotary needle cylinder in which are mounted needles having independent movements, a plurality of feeding stations, movable yarn controlled elements in cooperative association with the feeding stations, the movements of the yarn controlled elements readily indicating to the operator of the machine the relative rates at which the yarns are being knitted.

10. Indicating mechanism for a multi-feed knitting machine providing visual indications to inform the operator of the machine when the same amounts of yarn are not being knitted at each of two feeding stations thereby permitting the operator to effect adjustments readily to effect the knitting of uniform fabric.

11. A method of adjusting the feeding of two or more yarns to the needles of a knitting machine consisting in observing the relative rates of movement of yarn-movable members and adjusting yarn tension until the relative rates of movement of the said members are substantially the same.

12. A multi-feed knitting machine and means associated with each feed, the said means being so constructed and operated as to visually indicate to the operator of the machine whether or not yarns fed to the needles at two or more of the feeding stations are being fed to the needles at substantially the same rate, in combination with means for adjusting the relative feeding rates of the yarns to effect the knitting of uniform fabric.

13. A multi-feed knitting machine and means associated with each feed, the said means being so constructed and operated that, by inspection of the said means, the operator of the machine can readily determine which one of two of the said yarns is being fed to the needles of the knitting machine at the faster rate, in combination with means for adjusting the relative feeding rates of the yarns to effect the knitting of uniform fabric.

14. A multi-feed knitting machine, means for knitting a plurality of yarns independently at each of several feeding stations, a plurality of rotary discs disposed in overlapping relation to one another, each yarn in passing from the source of supply to the needles engaging the periphery of one of the discs, the drawing of the several yarns from the source of supply incidental to the knitting of fabric causing the discs to rotate, the overlapping portions of the discs being so constructed as to indicate to the operator of the machine whether or not the several yarns are being knitted into the fabric at the same rate.

15. A support and a plurality of like yarn rotatable members mounted thereon, a tension member associated with each said yarn rotatable member, the said yarn rotatable members each having peripheral indications thereon adapted to register with peripheral indications on an adjacent and overlapping yarn rotatable member, the construction and operation being such that the registering indications of adjacent yarn rotatable members will indicate to the operator when the several yarns are being fed at the same rate.

16. A support and a plurality of like yarn rotatable members mounted thereon, the said yarn rotatable members each having peripheral indications thereon adapted to register with peripheral indications on an adjacent and overlapping yarn rotatable member, the construction and operation being such that the registering indications of adjacent yarn rotatable members will indicate to the operator when the several yarns are being fed at the same rate.

17. A multi-feed knitting machine and a plurality of yarns each being fed to the needles at a feeding station, yarn controlled means operatively positioned between the source of supply and the needles for visually indicating to the operator of the machine when all the yarns are being knitted into the fabric at the same rate.

18. A multi-feed knitting machine having cam means at each feeding station for determining the length of stitch knitted at each said feeding station, means for adjusting the stitch length at each feeding station, in combination with means operatively positioned between the source of yarn supply and the needles for indicating to the operator of the machine when all or some of the yarns are not being knitted by the needles at the several feeding stations at the same rate.

19. A multi-feed knitting machine having cam means at each feeding station for determining the length of stitch knitted at each said feeding station, means for adjusting the stitch length at each feeding station, in combination with means arranged to be operatively positioned between the source of yarn supply and the needles for visually indicating to the operator of the machine when all or some of the yarns are not being knitted by the needles at the several feeding stations at the same rate, in combination with means for adjusting the relative feeding rates of the yarns to effect the knitting of uniform fabric.

20. A multi-feed knitting machine having cam means at each feeding station for determining the length of stitch knitted at each said feeding station, means for adjusting the stitch length at each feeding station, in combination with means operatively positioned between the source of yarn supply and the needles for indicating to the operator of the machine when all or some of the yarns are not being knitted by the needles at the several feeding stations at the same rate, the indicating means including members moved by the yarn so as to give the desired indications.

21. A multi-feed knitting machine having cam means at each feeding station for determining the length of stitch knitted at each said feeding station, means for adjusting the stitch length at each feeding station, in combination with means operatively positioned between the source of yarn supply and the needles for indicating to the operator of the machine when all or some of the yarns are not being knitted by the needles at the several feeding stations at the same rate, the indicating means including a yarn rotatable member the rotations of which measure the rate at which one of the said yarns is being knitted into the fabric.

22. In a multi-feed knitting machine, means for indicating whether two yarns which are moving from their respective sources of supply are being knitted at the same or different rates, said means comprising two rotating mutually cooperating members, each yarn serving to rotate one of said members, in combination with means for adjusting the relative feeding rates of the yarns to effect the knitting of uniform fabric.

23. A multi-feed knitting machine at each of a plurality of feeding stations of which a separate yarn is knitted by the knitting instrumentalities of a knitting machine, a freely rotatable member mounted in association with each of a plurality of feeding stations and in engagement with the yarns in such a manner that the advancing of the yarns which are being knitted, effects rotation of the said rotary members, the rotary members at two of the feeding stations being so disposed and constructed that the aforesaid rotations of the said members inform the operator whether or not two of the yarns are being knitted into the fabric at the same rate.

24. A multi-feed knitting machine at each of a plurality of feeding stations of which a yarn is knitted, means for association with the yarns to determine whether or not the yarns are being knitted at the same rate, said means including a freely rotatable member, the rotations of which are imparted by one of the yarns as they pass from the source of supply to the knitting instrumentalities, the construction and operation being such that the rotations of the member inform the operator of the machine whether or not the same lengths of yarn are being knitted at two feeding stations during the same interval of time, in combination with means for adjusting the relative feeding rates of the yarns to effect the knitting of uniform fabric.

25. A multi-feed knitting machine at each of a plurality of feeding stations of which a yarn is fed to the needles, means associated with each of a plurality of said feeding stations and including a movable element, the movements of which are imparted to the said element by one of the yarns, the construction and operation of the means being such that it visually indicates to the operator of the machine whether or not two of the yarns are being fed to the knitting machine at the same rate, in combination with means for adjusting the relative feeding rates of the yarns to effect the knitting of uniform fabric.

26. A multi-feed knitting machine having means for feeding a yarn to the needles at each of a plurality of feeding stations, indicating means at adjacent feeding stations, said indicating means including movable members having overlapping and registering indications, the construction and operation being such that when the two yarns fed to the needles at adjacent feeding stations are being knitted by the needles, the indications inform the operator of the machine when the two yarns are not being fed to the needles at the same rate.

27. A multi-feed knitting machine having means for feeding a yarn to the needles at each of a plurality of feeding stations, indicating means at adjacent feeding stations, said indicating means including rotatable members having overlapping and registering indications, the construction and operation being such that when the two yarns fed to the needles at adjacent feeding stations are being knitted by the needles, the indications inform the operator of the machine when the two yarns are not being fed to the needles at the same rate.

28. A multi-feed knitting machine at each of a plurality of feeding stations of which a yarn is fed to the needles, a rotatable member associated with each of a plurality of said feeding stations, the rotations of which are imparted to the said member by one of the yarns, the rotations of the said member being such as to indicate visually, at any instant, to the operator of the machine whether or not two of the yarns are being fed to the needles at the same rate.

29. A multi-feed knitting machine at each of a plurality of feeding stations of which a yarn is fed to the needles, means associated with each of a plurality of said feeding stations and including a rotatable element, the rotations of which are imparted to the said element by one of the yarns, the construction and operation of the means being such that it visually indicates to the operator of the machine at any instant whether or not two of the yarns are being fed to the knitting machine at the same rate.

30. In combination with a knitting machine, a yarn controlled mechanism so constructed and arranged as to indicate at any instant whether the speed at which said yarn is moving bears the desired relation to the speed of another moving element.

31. In combination with a machine having provision for the simultaneous feeding of at least two yarns, a yarn controlled mechanism so constructed and arranged as to indicate at any instant whether one of the said two yarns is moving at the same speed as the other yarn.

32. In combination with a knitting machine having provision for the simultaneous feeding of at least two yarns, a yarn controlled mechanism so constructed and arranged as to indicate at any instant whether one of the said two yarns is moving at the same speed as the other yarn.

ROBERT H. LAWSON.